(12) United States Patent
Dasika et al.

(10) Patent No.: US 12,298,443 B2
(45) Date of Patent: May 13, 2025

(54) SYSTEM AND METHOD FOR CALIBRATING AGRICULTURAL FIELD SURFACE PROFILE SENSORS

(71) Applicant: CNH Industrial America LLC, New Holland, PA (US)

(72) Inventors: Surya Saket Dasika, Lombard, IL (US); Michael R. Cozza, Pittsburgh, PA (US); Thamer Z. Alharbi, Naperville, IL (US)

(*) Notice: Subject to any disclaimer, the term of this patent is extended or adjusted under 35 U.S.C. 154(b) by 757 days.

(21) Appl. No.: 17/551,498

(22) Filed: Dec. 15, 2021

(65) Prior Publication Data
US 2023/0184909 A1 Jun. 15, 2023

(51) Int. Cl.
*G01S 7/497* (2006.01)
*A01B 49/02* (2006.01)
(Continued)

(52) U.S. Cl.
CPC ............ *G01S 7/497* (2013.01); *A01B 79/005* (2013.01); *G01B 11/303* (2013.01);
(Continued)

(58) Field of Classification Search
CPC ........ G01S 7/497; G01S 7/4865; G01S 17/89; G01S 17/42; G01S 17/88; A01B 79/005;
(Continued)

(56) References Cited

U.S. PATENT DOCUMENTS 5,509,486 A * 4/1996 Anderson .......... A01D 41/1278
172/6
7,706,151 B2 4/2010 Neidorff et al.
(Continued)

FOREIGN PATENT DOCUMENTS

DE 102017211623 A 1/2019

OTHER PUBLICATIONS

Zwieback et al., "A Polarimetric First-Order Model of Soil Moisture Effects on the DInSAR Coherence", Article, Remote Sensing, Jun. 8, 2015, pp. 7571-7596 https://www.mdpi.com/2072-4292/7/6/7571.

*Primary Examiner* — Dale W Hilgendorf
*Assistant Examiner* — Frank T Glenn, III
(74) *Attorney, Agent, or Firm* — Rebecca Henkel; Rickard K. DeMille; Peter K. Zacharias

(57) ABSTRACT

An agricultural implement includes a sensor configured to emit output signals for reflection off of a surface and detect reflections of the output signals as return signals. Furthermore, the agricultural implement includes a computing system configured to control the sensor such that the sensor emits the output signals for reflection off of a calibration device including a base portion and a plurality of projections extending outward from the base portion such that a top surface of the calibration device approximates a surface profile of the field. Moreover, the computing system is configured to receive data indicative of a profile of the top surface of the calibration device from the sensor in a spatial domain. Additionally, the computing system is configured to convert the received data to a frequency domain using a spectral analysis technique and calibrate an operation of the sensor based on the converted data.

14 Claims, 6 Drawing Sheets

(51) Int. Cl.
  *A01B 79/00* (2006.01)
  *G01B 11/30* (2006.01)
  *G01S 7/4865* (2020.01)
  *G01S 17/89* (2020.01)
(52) U.S. Cl.
  CPC ............ *G01S 7/4865* (2013.01); *G01S 17/89* (2013.01); *A01B 49/02* (2013.01)
(58) Field of Classification Search
  CPC ... A01B 49/02; A01B 49/027; A01B 63/1112; G01B 11/303; G01B 21/042
  See application file for complete search history.

(56) References Cited

U.S. PATENT DOCUMENTS

| | | | |
|---|---|---|---|
| 8,359,141 | B1 | 1/2013 | Lange |
| 9,585,301 | B1 | 3/2017 | Lund et al. |
| 9,750,174 | B2 | 9/2017 | Sauder et al. |
| 10,151,839 | B2 * | 12/2018 | McPeek ................ G01S 7/4865 |
| 10,564,013 | B2 | 2/2020 | Zhitomirsky |
| 2012/0152877 | A1 * | 6/2012 | Tadayon ................ F24S 40/90 |
| | | | 901/30 |
| 2014/0180549 | A1 * | 6/2014 | Siemens ................ A01B 39/18 |
| | | | 701/50 |
| 2016/0275682 | A1 * | 9/2016 | Natroshvili ............... G06T 7/85 |
| 2018/0033124 | A1 * | 2/2018 | Thomasson .......... G06V 20/188 |
| 2020/0142073 | A1 | 5/2020 | Gassend et al. |
| 2021/0000006 | A1 | 1/2021 | Ellaboudy et al. |
| 2021/0003514 | A1 | 1/2021 | Kitic |
| 2021/0025972 | A1 | 1/2021 | Loesch |
| 2022/0170749 | A1 * | 6/2022 | Qu .......................... G01S 19/47 |

* cited by examiner

SYSTEM AND METHOD FOR CALIBRATING AGRICULTURAL FIELD SURFACE PROFILE SENSORS

FIELD OF THE INVENTION

The present disclosure generally relates to detecting the surface profile of an agricultural field and, more particularly, to systems and methods for calibrating sensors used to detect the surface profile of an agricultural field.

BACKGROUND OF THE INVENTION

It is well known that, to attain the best agricultural performance from a field, a farmer must cultivate the soil, typically through a tillage operation, Modern farmers perform tillage operations by pulling a tillage implement behind an agricultural work vehicle, such as a tractor, Tillage implements typically include a plurality of ground engaging tools, such as harrow disks, shanks, leveling blades, tines, rolling baskets, and/or the like, which loosen and/or otherwise agitate the soil to prepare the soil for subsequent planting operations.

Upon completion of the tillage operation, it is generally desirable that the ridges and valleys present within the field have a predetermined height and depth, respectively. As such, systems have been developed that allow the surface profile of the field to be determined as the implement travels across the field. However, further improvements to such systems are needed. For example, the sensors of such systems need to be calibrated before operation to accurately determine the surface profile.

Accordingly, a system and method for calibrating sensors used to detect a surface profile of an agricultural field would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural implement. The agricultural implement includes a frame and a plurality of ground-engaging tools supported on the frame, with the plurality of ground-engaging tools configured to perform an agricultural operation on a field as the agricultural implement travels across the field. Furthermore, the agricultural implement includes a sensor supported on the frame, with the sensor configured to emit output signals for reflection off of a surface and detect reflections of the output signals as return signals. Additionally, the agricultural implement includes a computing system communicatively coupled to the sensor. As such, the computing system is configured to control an operation of the sensor such that the sensor emits the output signals for reflection off of a calibration device including a base portion and a plurality of projections extending outward from the base portion such that a top surface of the calibration device approximates a surface profile of the field. Moreover, the computing system is configured to receive data indicative of a profile of the top surface of the calibration device from the sensor in a spatial domain. In addition, the computing system is configured to convert the received data to a frequency domain using a spectral analysis technique and calibrate an operation of the sensor based on the converted data.

In another aspect, the present subject matter is directed to a system for calibrating sensors configured to detect a surface profile of an agricultural field. The system includes a calibration device including a base portion and a plurality of projections extending outward from the base portion such that the calibration device approximates the surface profile of the agricultural field. Furthermore, the system includes a sensor configured to emit output signals for reflection off of a surface and detect reflections of the output signals as return signals. Additionally, the system includes a computing system communicatively coupled to the sensor. In this respect, the computing system is configured to control an operation of the sensor such that the sensor emits the output signals for reflection off of a top surface of the calibration device. Moreover, the computing system is configured to receive data indicative of a profile of the top surface of the calibration device from the sensor in a spatial domain. In addition, the computing system is configured to convert the received data to a frequency domain using a spectral analysis technique and calibrate an operation of the sensor based on the converted data.

In a further aspect, the present subject matter is directed to a method for calibrating a sensor configured to detect a surface profile of an agricultural field. The sensor, in turn, is configured to emit output signals for reflection off of a surface and detect reflections of the output signals as return signals. The method includes controlling, with a computing system, an operation of the sensor such that the sensor emits the output signals for reflection off of a top surface of a calibration device including a base portion and a plurality of projections extending outward from the base portion such that the calibration device approximates the surface profile of the agricultural field. Furthermore, the method includes receiving, with the computing system, data indicative of a profile of the top surface of the calibration device from the sensor in a spatial domain. Additionally, the method includes converting, with the computing system, the received data to a frequency domain using a spectral analysis technique. Moreover, the method includes calibrating, with the computing system, an operation of the sensor based on the converted data.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present, technology, including the best mode thereof, directed to one of ordinary skill in the art, is set forth in the specification, which makes reference to the appended figures, in which.

Figure 1:
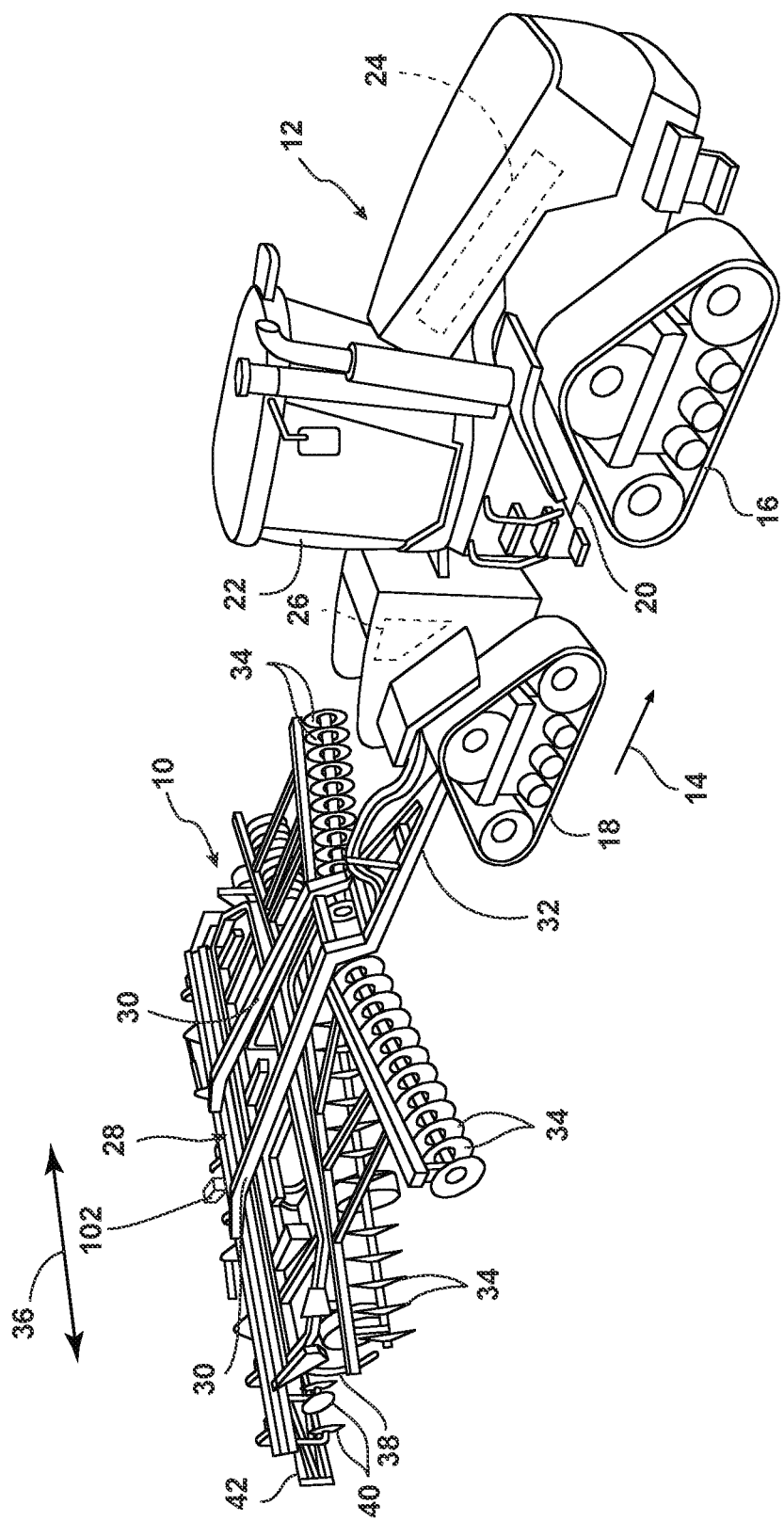
FIG. 1 illustrates a perspective view of one embodiment of an agricultural implement being towed by an associated work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for calibrating sensors configured to detect the surface profile of an agricultural field. As will be described below, the disclosed system includes a sensor configured to emit output signals for reflection off of a surface and detect reflections of the output signals as return signals. For example, the sensor may be configured as a LiDAR sensor. As such, in some embodiments, the sensor may be supported on the frame of an agricultural machine (e.g., an agricultural implement) such that the sensor has a field of view directed aft of the implement.

In several embodiments, the disclosed system also includes a calibration device for use in calibrating the sensor. More specifically, the calibration device includes a base portion and a plurality of projections extending outward from the base portion. As such, the calibration device may generally approximate the surface profile of the agricultural field. For example, the projections may be spaced apart from each other along the base portion such that projections and the spaces defined therebetween imitate or otherwise approximate the periodically repeating ridges and valleys present within the field behind the implement.

In this respect, a computing system of the disclosed system is configured to calibrate the operation of the sensor based on captured data associated with the top surface of the calibration device. Specifically, in several embodiments, the computing system controls the operation of the sensor such that the sensor emits the output signals for reflection off of the top surface of the calibration device. Furthermore, the computing system receives data indicative of the profile of the top surface of the calibration device from the sensor in the spatial domain. Additionally, the computing system converts the received data to the frequency domain using a spectral analysis technique (e.g., a Fourier transformation technique). Thereafter, the computing system calibrates the operation of the sensor based on the converted data. For example, in some embodiments, the computing system may determine the magnitude and/or phase angle of the converted data at, the frequency corresponding to the spacing of the ground-engaging tools of the implement on which the sensor is supported. In this respect, the computing system may compare the determined magnitude and/or phase angle to associated predetermined range(s). Thereafter, when the determined magnitude and/or phase angle fall outside of the associated range(s) (thereby indicating that the sensor needs to be calibrated), the computing system may initiate an adjustment(s) to the operation of the sensor. Such adjustment(s) may be mechanical (e.g., adjustments to the positioning or orientation of the sensor) and/or parametric (e.g., adjustments to an offset(s) applied to the data to be captured by the sensor).

The disclosed system and method improve the operation of the sensor and the associated agricultural machine (e.g., the agricultural implement). More specifically, as described above, the computing system converts data associated with the top surface of the calibration device from the spatial domain to the frequency domain, Thereafter, the frequency domain data is used to calibrate the sensor. In this respect, the use of data in the frequency domain requires simpler logic and fewer computing resources (e.g., processing power and/or memory) to accurately calibrate the sensor than the data in the spatial domain.

Referring now to the drawings, FIG. 1 illustrates a perspective view of an agricultural implement 10 being towed by an associated work vehicle 12 across a field in a direction of travel (indicated by arrow 14). In the illustrated embodiment, the agricultural implement 10 is configured as a tillage implement (e.g., a disk tipper) and the work vehicle 12 is configured as an agricultural tractor. However, in alternative embodiments, the agricultural implement 10 may correspond to any other suitable type of agricultural implement (e.g., a seed-planting implement, a towable sprayer, etc.) and the work vehicle 12 may correspond to any other suitable type of vehicle (e.g., an agricultural harvester, a self-propelled sprayer, etc.).

As shown in FIG. 1, the vehicle 12 includes a pair of front track assemblies 16, a pair of rear track assemblies 18, and a frame or chassis 20 coupled to and supported by the track assemblies 16, 18. An operator's cab 22 may be supported by a portion of the chassis 20 and may house various input devices for permitting an operator to control the operation of one or more components of the vehicle 12 and/or one or more components of the implement 10. Furthermore, the vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

Additionally, as shown in FIG. 1, the implement 10 includes a frame 28, More specifically, the frame 28 generally includes a plurality of structural frame members 30, such as beams, bars, and/or the like, which are configured to support or couple to a plurality of components. For example, as will be described below, the frame 28 may be configured to support one or more ground-engaging tools configured to perform an agricultural operation on a field as the implement 10 travels across the field. Furthermore, a hitch assembly 32 may be connected to the frame 28 and configured to couple the implement 10 to the vehicle 12.

In several embodiments, the frame 28 may support one or more gangs or sets of disk blades 34. Each disk blade 34 may, in turn, be configured to penetrate into or otherwise engage the soil as the implement 10 is pulled through the field. In this regard, the various gangs of disk blades 34 may be oriented at an angle relative to the direction of travel 14 to promote more effective tilling of the soil. In the embodiment shown in FIG. 1, the implement 10 includes four gangs of disk blades 34 supported on the frame 28 adjacent to its forward end. However, in alternative embodiments, the implement 10 may include any other suitable number of gangs. Furthermore, in one embodiment, the gangs of disk blades 34 may be mounted to the frame 28 at any other suitable location, such as adjacent to its aft end.

Moreover, in several embodiments, the implement frame 28 may be configured to support other ground-engaging tools. For instance, in the illustrated embodiment, the frame 28 is configured to support a plurality of shanks 38. As shown, the shanks 38 are spaced apart from each other on the frame 28 in a lateral direction (indicated by arrow 36) of the implement 10. The lateral direction 36, in turn, extends perpendicular to the direction of travel 14 of the implement/vehicle 10/12. As such, the shanks 38 are configured to rip or otherwise till the soil as the implement 10 is towed across the field. Furthermore, in the illustrated embodiment, the frame 28 is also configured to support a plurality of leveling blades 40 and a plurality of rolling (or (Tumbler) basket assemblies 42 positioned aft of the shanks 38. In such an embodiment, the leveling blades 40 may be spaced apart from each other in the lateral direction 36 of the implement 10. Moreover, the leveling blades 40 may be staggered relative to the shanks 38 in the lateral direction 36. That is, each leveling blade 40 may be positioned between a pair of adjacent shanks 38 in the lateral direction 36. As will be described below, such positioning of the shanks 38 and the leveling blades 40 results in a soil surface profile aft of the implement 10 having periodically repeating ridges and valleys in the lateral direction 36. However, in other embodiments, any other suitable ground-engaging tools may be coupled to and supported by the implement frame 28.

It should be further appreciated that the configuration of the agricultural implement 10 and the associated work vehicle 12 described above and shown in FIG. 1 is provided only to place the present subject matter in an exemplary field of use. Thus, it should be appreciated that the present subject matter may be readily adaptable to any manner of implement and/or vehicle configuration.

Additionally, the implement 10 and/or the vehicle 12 may include one or more sensors 102 coupled thereto and/or supported thereon. As will be described below, the sensor(s) 102 are configured to capture data indicative of the profile of a surface (e.g., the surface profile of an agricultural field). For example, in the illustrated embodiment, a sensor 102 is supported on the frame 28 of the implement 10 adjacent to its aft end. In such an embodiment, the sensor 102 has a field of view directed aft of the implement 10 such that the sensor 102 is configured to capture data indicative of the surface profile of the field behind the implement 10 as the implement 10 travels across the field in the direction of travel 14. However, in alternative embodiments, the sensor(s) 102 may be positioned at any other suitable location(s) on the implement 10 and/or the vehicle 12 such that sensor(s) 102 is configured to capture data at any other suitable location(s) relative to the implement/vehicle 10/12, such as on a boom assembly (not shown). Moreover, the implement 10 and/or the vehicle 12 may include any other suitable number of sensors 102.

Figure 2:
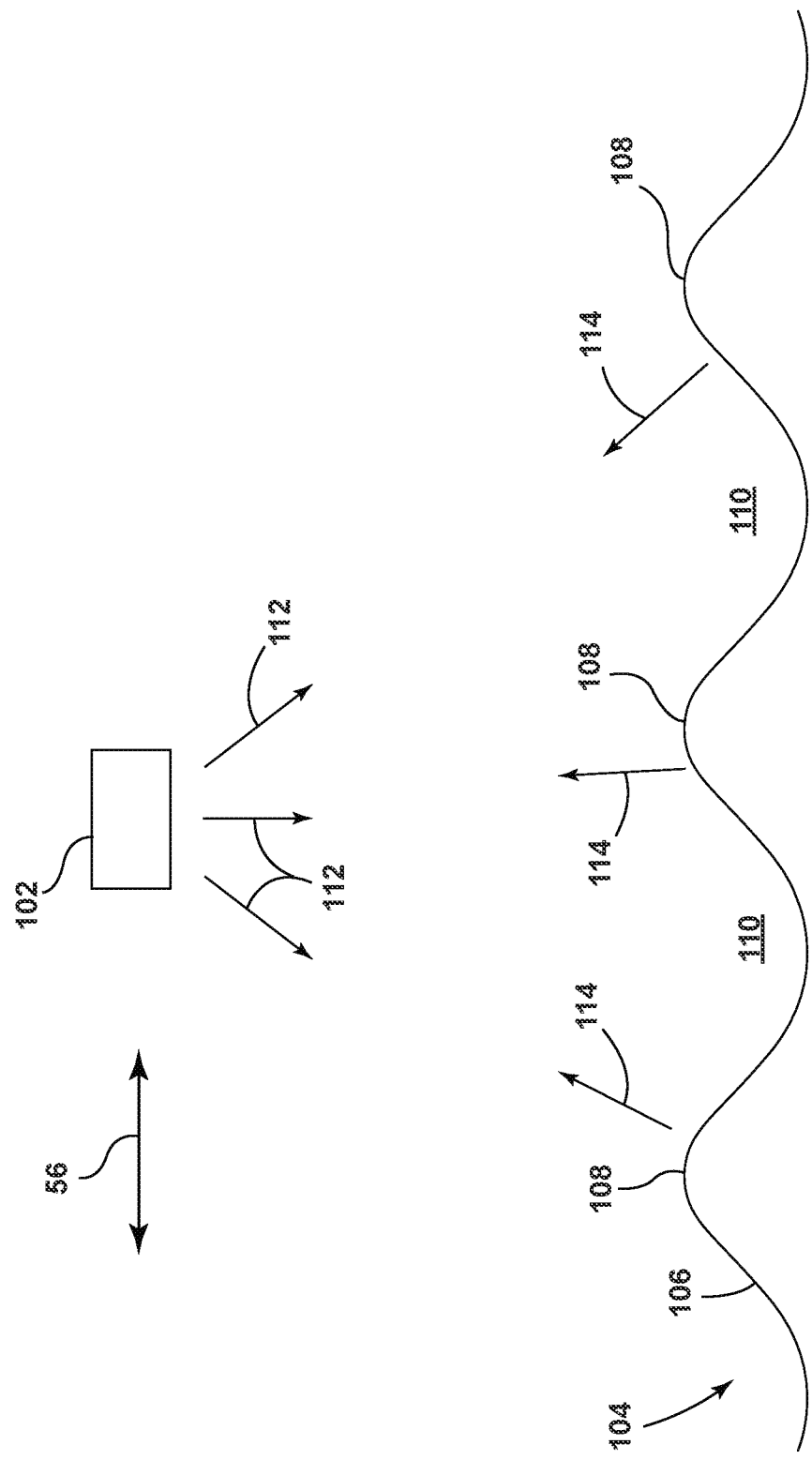
FIG. 2 illustrates a diagrammatic view of one embodiment of a sensor in accordance with aspects of the present subject matter, particularly illustrating the sensor emitting output signals at the surface of a field.

FIG. 2 illustrates a diagrammatic view of the sensor 102. In the illustrated view, the sensor 102 is shown capturing data indicative of the profile of a top surface or soil surface 106 of a portion of an agricultural field 104 positioned aft of the implement 10. More specifically, as the implement/vehicle 10/12 travels across the field 104 in the direction of travel 14, the ground-engaging tools (e.g., the shanks 38 and the leveling blades 40) work the soil such that the profile of the soil surface 106 defines a periodic shape in the lateral direction 36. For example, the field 104 may define a plurality of alternating ridges 108 and valleys 110 in the lateral direction 36. As indicated above, the sensor 102 may capture data associated with the soil surface 106 as the implement/vehicle 10/12 travels across the field 104, thereby allowing the profile of the soil surface 106 to be determined, Thereafter, when the determined soil surface profile deviates from a desired surface profile, an adjustment(s) to the operation of the ground-engaging tools may be made.

In general, the sensor 102 corresponds to any suitable device configured to capture data indicative of the soil surface profile of the field. For example, in several embodiments, the sensor 102 may correspond to a LiDAR device(s), such as a LiDAR scanner(s). In such embodiments, the sensor 102 is configured to emit output signals (e.g., as indicated by arrows 112) for reflection off of a surface and detect the reflections of the output signals as return signals (e.g., as indicated by arrows 114). Specifically, the sensor 102 may be configured to output light pulses from a light source (e.g., a laser outputting a pulsed laser beam) and detect the reflection of each pulse off the soil surface. Based on the time of flight of the light pulses, the specific location (e.g., 2-D or 3-D coordinates) of the soil surface relative to the sensor 102 may be calculated. By scanning the pulsed light over a given swath width (e.g., in the lateral direction 36), the profile of the soil surface may be detected across a given section of the field. Thus, by continuously scanning the pulsed light along the soil surface as the implement/vehicle 10/12 travel across the field, a plurality of single data point scan lines may be generated that includes soil surface profile data for all or a portion of the field.

Figure 3:
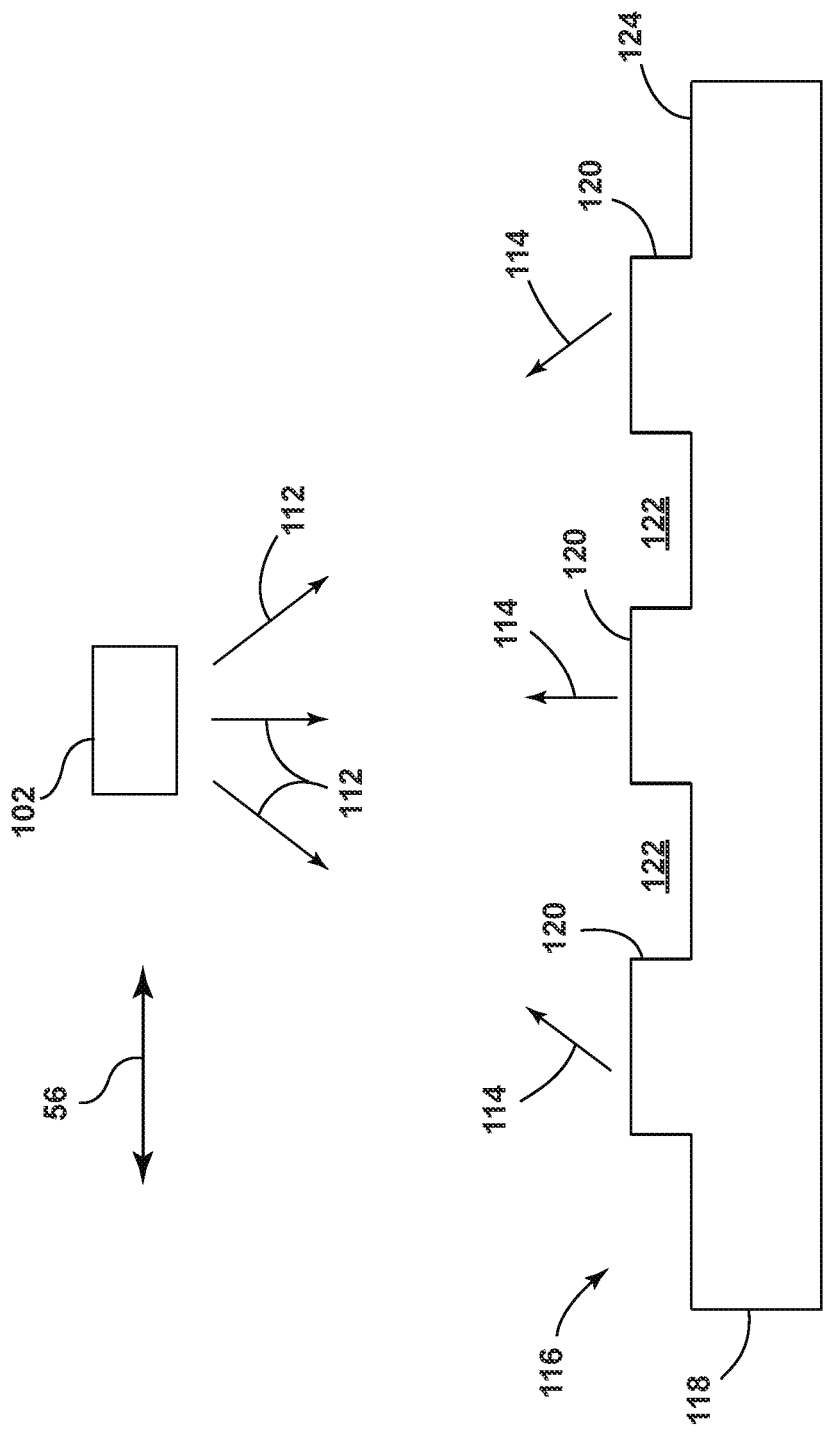
FIG. 3 illustrates another diagrammatic view of the sensor shown in FIG. 2, particularly illustrating the sensor emitting the output signals at the top surface of a calibration device.

FIG. 3 illustrates another diagrammatic view of the sensor 102. In the illustrated view, the sensor 102 is shown capturing data indicative of the profile of a top surface 124 of a calibration device 116. In general, for the sensor 102 to accurately detect the profile of the soil surface of the field, the sensor 102 must first be calibrated. In this respect, and as will be described below, the top surface 124 of the calibration device 116 (which has a known profile) can be scanned by the sensor 102 and the captured data can then be used to calibrate the sensor 102.

The calibration device 116 may correspond to any suitable device or apparatus having a known surface profile that can be used to calibrate the sensor 102. Specifically, in several embodiments, the calibration device 116 may imitate or otherwise approximate the profile of the soil surface aft of the implement 10. As mentioned above, the profile of the soil surface aft of the implement 10 is generally periodic, with alternating ridges and valleys in the lateral direction 36. Thus, in such embodiments, the calibration device 116 includes a base portion 118 and a plurality of projections 120 extending outward from the base portion 118. Moreover, the projections 120 are spaced apart from each other in the lateral direction 36 such that a cavity 122 are defined between each adjacent pair of projections 120. In this respect, the top surface 124 of the calibration device 116 defines a periodic profile approximating the profile of the soil surface of the field aft of the implement 10.

In some embodiments, the projections 120 and the cavities 122 may define a rectangular cross-sectional shape in the lateral direction 36. Thus, in such embodiments, the top surface 124 of the calibration device 116 may have a square wave-like profile. The soil surface of the field behind the implement 10 generally defines a profile that is closer to a triangular wave. However, it is difficult to form the calibration device 116 with such a profile. In this respect, by forming the top surface 124 of the calibration device 116 with a square wave-like profile and then using the mathematical relationship between square and triangular waveforms, the calibration device 116 can be formed more easily and in a more cost-effective manner while still having a suitable profile for calibrating the sensor 102. Alternatively, the top surface 124 of the calibration device 116 may have any other suitable profile.

Figure 4:
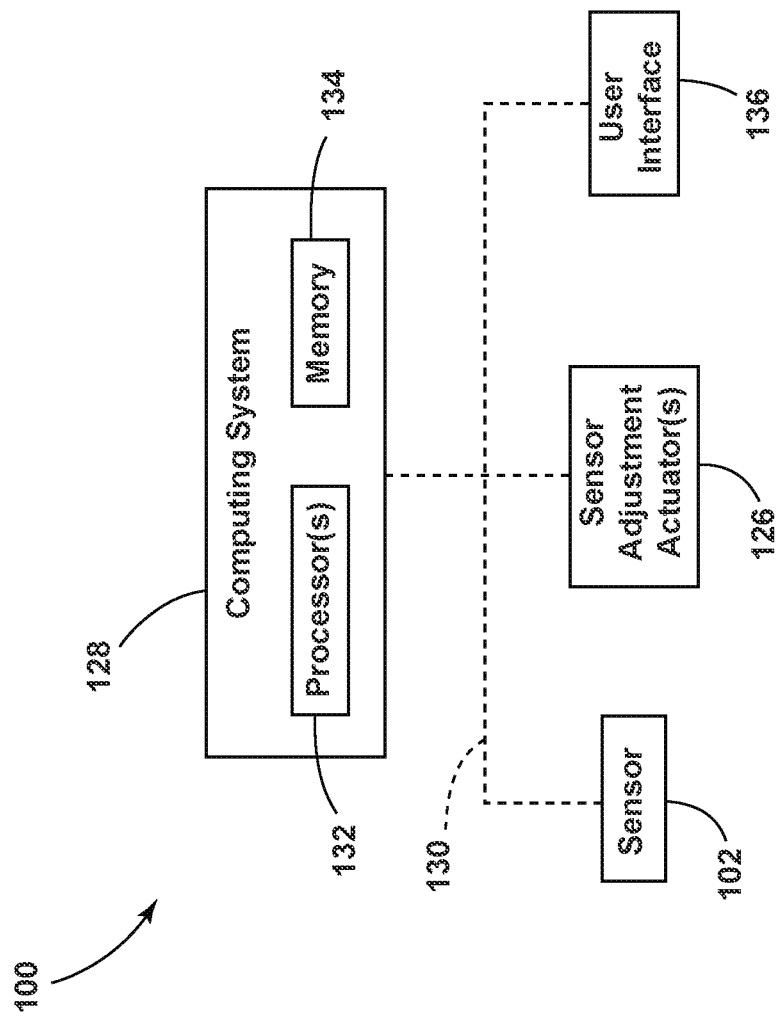
FIG. 4 illustrates a schematic view of one embodiment of a system for calibrating sensors configured to detect the surface profile of an agricultural field in accordance with aspects of the present subject matter.

Referring now to FIG. 4, a schematic view of one embodiment of a system 100 for calibrating sensors configured to detect the surface profile of an agricultural field is illustrated in accordance with aspects of the present subject matter. In general, the system 100 will be described herein with reference to the agricultural implement 10 and the work vehicle 12 described above with reference to FIGS. 1-3. However, it should be appreciated by those of ordinary skill in the art that the disclosed system 100 may generally be utilized with agricultural implements having any other suitable implement configuration and/or work vehicles having any other suitable vehicle configuration.

As shown in FIG. 4, the system 100 includes the sensor 102. In this respect, the system 100 may also include one or more sensor adjustment actuators 126. Specifically, the sensor adjustment actuator(s) 126 may be configured to adjust one or more mechanical parameters associated with the sensor 102. For example, the sensor adjustment actuator(s) 126 may be configured to adjust the position and/or orientation of the sensor 102 relative to the frame 28 of the implement 10 and/or the field surface. In this respect, the sensor adjustment actuator(s) 126 may correspond to any suitable device(s) configured to move the sensor 102, such as an electric motor(s), a solenoid(s), and/or the like.

Additionally, the system 100 may include the calibration device 116 (FIG. 3). As described above, the calibration device 116 may be a separate component from the implement 10 and/or the vehicle 12 that is used when calibrating the sensor 102.

Moreover, the system 100 includes a computing system 128 communicatively coupled to one or more components of the implement 10, the vehicle 12, and/or the system 100 to allow the operation of such components to be electronically or automatically controlled by the computing system 128. For instance, the computing system 128 may be communicatively coupled to the sensor 102 via a communicative link 130. As such, the computing system 128 may be configured to receive data from the sensor 102 that is indicative of the profile of a surface (e.g., the top surface 124 of the calibration device 116, the soil surface of a field, etc.). Furthermore, the computing system 128 may be communicatively coupled to the sensor adjustment actuator(s) 126 via the communicative link 130. In this respect, the computing system 128 may be configured to control the operation of the actuators sensor adjustment actuator(s) 126 to adjust the position/orientation of the sensor 102 during calibration. In addition, the computing system 128 may be communicatively coupled to any other suitable components of the implement 10, the vehicle 12, and/or the system 100.

In general, the computing system 128 may comprise one or more processor-based devices, such as a given controller or computing device or any suitable combination of controllers or computing devices. Thus, in several embodiments, the computing system 128 may include one or more processor(s) 132 and associated memory device(s) 134 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 134 of the computing system 128 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 134 may generally be configured to store suitable computer-readable instructions that, when implemented by the processor(s) 132, configure the computing system 128 to perform various computer-implemented functions, such as one or more aspects of the methods and algorithms that will be described herein. In addition, the computing system 128 may also include various other suitable components, such as a communications circuit or module, one or more input/output channels, a data/control bus and/or the like.

The various functions of the computing system 128 may be performed by a single processor-based device or may be distributed across any number of processor-based devices, in which instance such devices may be considered to form part of the computing system 128. For instance, the functions of the computing system 128 may be distributed across multiple application-specific controllers or computing devices, such as a navigation controller, an engine controller, a transmission controller, an implement controller, and/or the like.

In addition, the system 100 may also include a user interface 136. More specifically, the user interface 136 may be configured to provide feedback from the computing system 128 (e.g., feedback associated with the calibration of the sensor 102) to the operator. As such, the user interface 136 may include one or more feedback devices (not shown), such as display screens, speakers, warning lights, and/or the like, which are configured to provide feedback from the computing system 128 to the operator. As such, the user interface 136 may, in turn, be communicatively coupled to the computing system 128 via the communicative link 130 to permit the feedback to be transmitted from the computing system 128 to the user interface 136. Furthermore, some embodiments of the user interface 136 may include one or more input devices, such as touchscreens, keypads, touchpads, knobs, buttons, sliders, switches, mice, microphones, and/or the like, which are configured to receive inputs from the operator. In one embodiment, the user interface 136 may be mounted or otherwise positioned within the cab 22 of the work vehicle 12. However, in alternative embodiments, the user interface 136 may mounted at any other suitable location.

Figure 5:
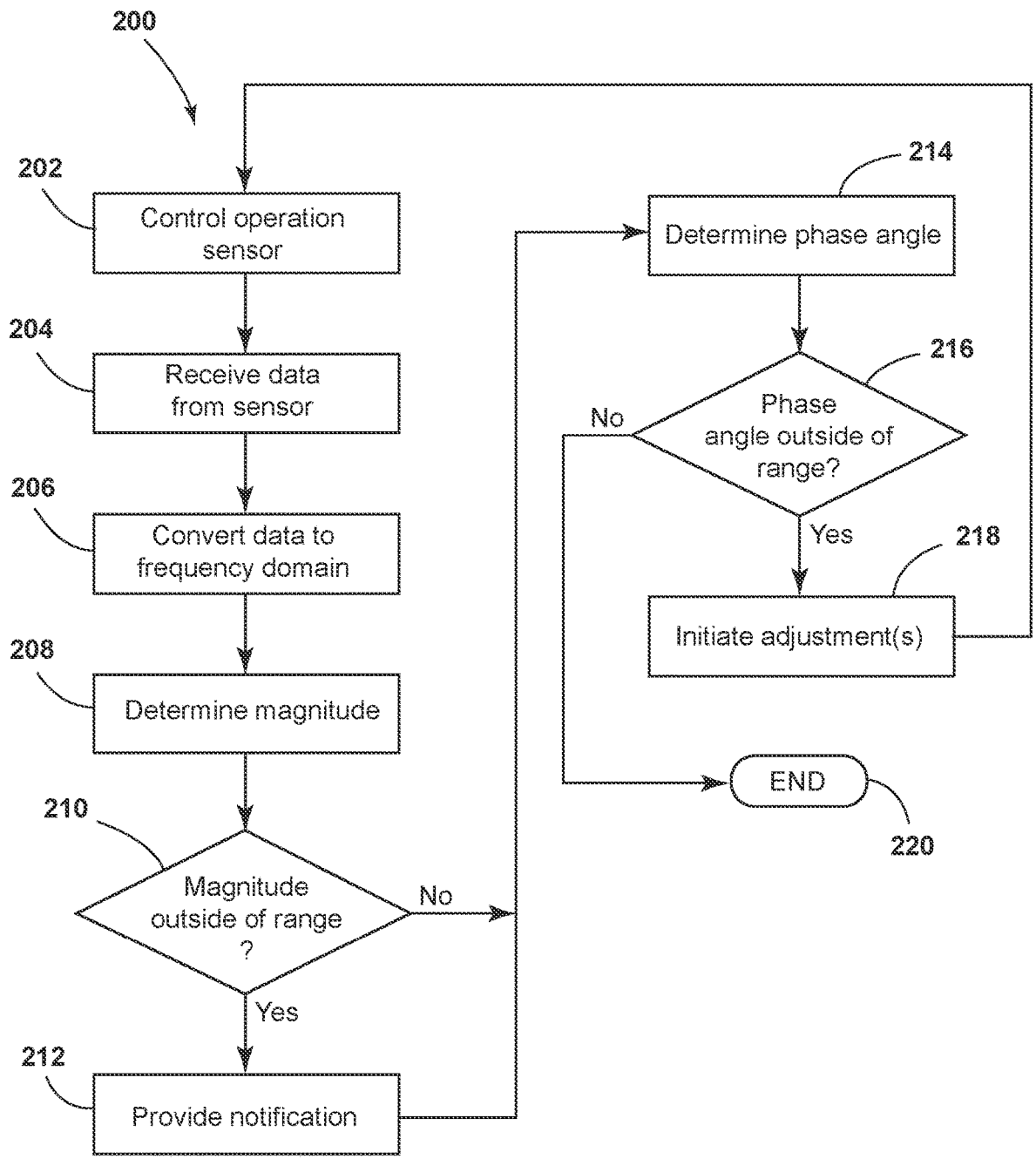
FIG. 5 illustrates a flow diagram providing one embodiment of example control logic for calibrating sensors configured to detect the surface profile of an agricultural field in accordance with aspects of the present subject matter.

Referring now to FIG. 5, a flow diagram of one embodiment of example control logic 200 that may be executed by the computing system 128 (or any other suitable computing system) for calibrating sensors configured to detect the surface profile of an agricultural field is illustrated in accordance with aspects of the present subject matter. Specifically, the control logic 200 shown in FIG. 5 is representative of steps of one embodiment of an algorithm that can be executed to calibrate sensors configured to detect the surface profile of an agricultural field in a manner that allows for accurate detection of the soil surface profile of an agricultural field without requiring substantial computing resources and/or processing time. However, in other embodiments, the control logic 200 may be used in association with any other suitable system, application, and/or the like for calibrating sensors configured to detect the surface profile of an agricultural field.

As shown in FIG. 5, at (202), the control logic 200 includes controlling the operation of a sensor such that the sensor emits the output signals for reflection off of a top surface of a calibration device. Specifically, as described above, the computing system 128 is communicatively coupled to the sensor 102 via the communicative link 130. Thus, in several embodiments, prior to the performance of an agricultural operation by the implement 10, the computing system 128 may transmit control signals to the sensor 102 via the communicative link 130. The control signals, in turn, instruct the sensor 102 to emit output signals (e.g., the output signals 112 in FIG. 3) for reflection off of the top surface 124 of the calibration device 116, For example, as mentioned above, in some embodiments, the sensor 102 may correspond to a LiDAR sensor. In such embodiments, upon receipt of the control signals, the sensor 102 may scan the top surface 124 of the calibration device 116 in the lateral direction 36 with light pulses.

Furthermore, at (204), the control logic 200 includes receiving data indicative of the profile of the top surface of the calibration device from the sensor. More specifically, as described above, the sensor 102 generally detects the reflections of the output signals off of the calibration device 116 as the return signals 114. For example, the sensor 102 may detect the reflection of each light pulse off the top surface 124 of the calibration device 116. Thereafter, based on the time of flight of the light pulses, the specific location (e.g., 2-D or 3-D) coordinates) of the top surface 124 of the calibration device 116 relative to the sensor 102 may be calculated. In this respect, the computing system 128 may receive data from the sensor 102 via the communicative link 130. Such data may generally be indicative of the specific location of the top surface 124 of the calibration device 116 relative to the sensor 102 (e.g., the coordinates), with such data being in the spatial domain.

Additionally, at (206), the control logic 200 includes converting the received data to the frequency domain using a spectral analysis technique. Specifically, in several embodiments, the computing system 128 may be configured to convert the data received at (204) from the spatial domain to the frequency domain using a spectral analysis technique. For example, in some embodiments, the computing system 128 may use a Fourier transformation technique, such as a Fast Fourier transformation (FFT) technique. Suitable FFT techniques may include the Cooley-Tukey, Prime Factor, Bruun's, Rader's, Bluestein's, and/or Hexagonal techniques. However, in alternative embodiments, the computing system 128 may be configured to implement any other suitable spectral analysis techniques, such as the Bartlett's, Welch's, and/or Least-squares techniques.

As will be described below, the data converted at (206), which is in the frequency domain, is used to calibrate the sensor 102. In general, as mentioned above, the spacing of the ground-engaging tools on the implement 10 creates the periodic profile of the soil surface behind the implement 10. This periodic soil surface profile allows for the calibration of the sensor 102 using frequency domain data indicative of the profile of the calibration device 116. Specifically, the period, frequency, wavelength, or other parameters of the periodic soil surface profile are influenced based on the tool spacing. In this respect, the computing system 128 may determine one or more parameter(s) of the converted data at a frequency corresponding to the spacing of the plurality of ground-engaging tools of the implement 10. Moreover, the computing system 128 may compare the determined parameter(s) to an associated predetermined parameter range(s). Thereafter, when the determined parameter(s) falls outside of the associated range(s), the computing system 128 may initiate one or more adjustments to the operation of the sensor 102 to calibrate the sensor 102.

At (208), the control logic 200 includes determining the magnitude of the converted data at the frequency corresponding to the spacing of the plurality of ground-engaging tools on the implement. Specifically, in several embodiments, the computing system 128 may analyze the data converted to the frequency domain at (206) and determine the magnitude of such data at the frequency corresponding to the spacing of the plurality of ground-engaging tools (e.g., the shanks 38 and/or the leveling blades 40) on the implement 10.

Moreover, at (210), the control logic 200 includes comparing the determined magnitude to a predetermined range of magnitudes. Specifically, in several embodiments, the computing system 128 may compare magnitude determined at (208) to an associated predetermined range of magnitudes. When the determined magnitude is within the associated range, the scaling applied to the data being captured by the sensor 102 is correct. In such instances, the control logic 200 proceeds to (214). Conversely, when the determined magnitude falls outside of the associated range, the scaling applied to the data being captured by the sensor 102 is incorrect. In such instances, the control logic 200 proceeds to (212).

Moreover, at (212), the control logic 200 may include providing a notification to the operator of the implement/vehicle indicating that the scaling applied to the data being captured by the sensor is incorrect. Specifically, the computing system 128 may configured to transmit instructions to the user interface 136 (e.g., the communicative link 130). Such instructions may, in turn, instruct the user interface 136 to provide a notification to the operator of the implement/vehicle 10/12 (e.g., by causing a visual or audible notification or indicator to be presented to the operator) providing an indication that the scaling applied to the data being captured by the sensor 102 is incorrect. In such instances, the operator may then perform any suitable corrective action necessary to correct this issue.

In addition, at (214), the control logic 200 includes determining the phase angle of the converted data at the frequency corresponding to the spacing of the plurality of ground-engaging tools on the implement. Specifically, in several embodiments, the computing system 128 may analyze the data converted to the frequency domain at (206) and determine the phase angle of such data at the frequency corresponding to the spacing of the plurality of ground-engaging tools (e.g., the shanks 38 and/or the leveling blades 40) on the implement 10.

Moreover, at (216), the control logic 200 includes comparing the determined phase angle to a predetermined range of magnitudes. Specifically, in several embodiments, the computing system 128 may compare phase angle determined at (214) to an associated predetermined range of phase angles. When the determined phase angle is within the associated range, no additional calibration of the sensor 102 is needed. In such instances, the control logic 200 proceeds to and ends at (220). Conversely, when the determined phase angle falls outside of the associated range, the data captured by the sensor 102 may indicate a ridge in the field when a valley exists and a valley in the field when a ridge exists. In such instances, the control logic 200 proceeds to (218).

Moreover, at (218), the control logic 200 may include initiating one or more adjustment to the operation of the sensor. Specifically, when the phase angle determined at (214) falls outside of the associated range, the computing system 128 may configured to adjust one or more parametric offsets to be applied to the data received from the sensor 102. Such offset(s) may, in turn, result in the data indicating a ridge in the field when a ridge exists and a valley in the field when a valley exists. Alternatively, the computing system 128 may be configured to make any other suitable parametric or software-based adjustments when the determined parameter(s) of the frequency domain data fall outside of an associated predetermined parameter range(s).

In addition, the computing system 128 may be configured to initiate one or more mechanical adjustments to the sensor 102 when the determined parameter(s) of the frequency domain data fall outside of an associated predetermined parameter range(s). For example, in such instances, the computing system 128 may be configured to initiate one or more adjustments to the position and/or orientation of the sensor 102 relative to the frame 28 of the implement 10. Specifically, the computing system 128 may transmit control signals to the sensor adjustment actuator(s) 126 (e.g., the communicative link 130). Such control signals may, in turn, instruct the sensor adjustment actuator(s) 126 to adjust the position and/or orientation of the sensor 102 relative to the frame 28. Alternatively, the computing system 128 may be configured to initiate one or more mechanical adjustments to the sensor 102.

After making any adjustments at (218), the magnitude and phase angle determinations should be checked again to ensure an accurate calibration. As such, upon completion of (218), the control logic 200 returns to (202) and proceeds from (202) as described above.

The control logic 200 improves the operation of the sensor 102 and the implement/vehicle 10/12. More specifically, as described above, the computing system 128 converts data associated with the top surface 124 of the calibration device 116 from the spatial domain to the frequency domain. Thereafter, the frequency domain data is used to calibrate the sensor 102. In this respect, the use of data in the frequency domain requires simpler control logic and fewer computing resources (e.g., processing power and/or memory) to accurately calibrate the sensor 102 than the data in the spatial domain.

Figure 6:
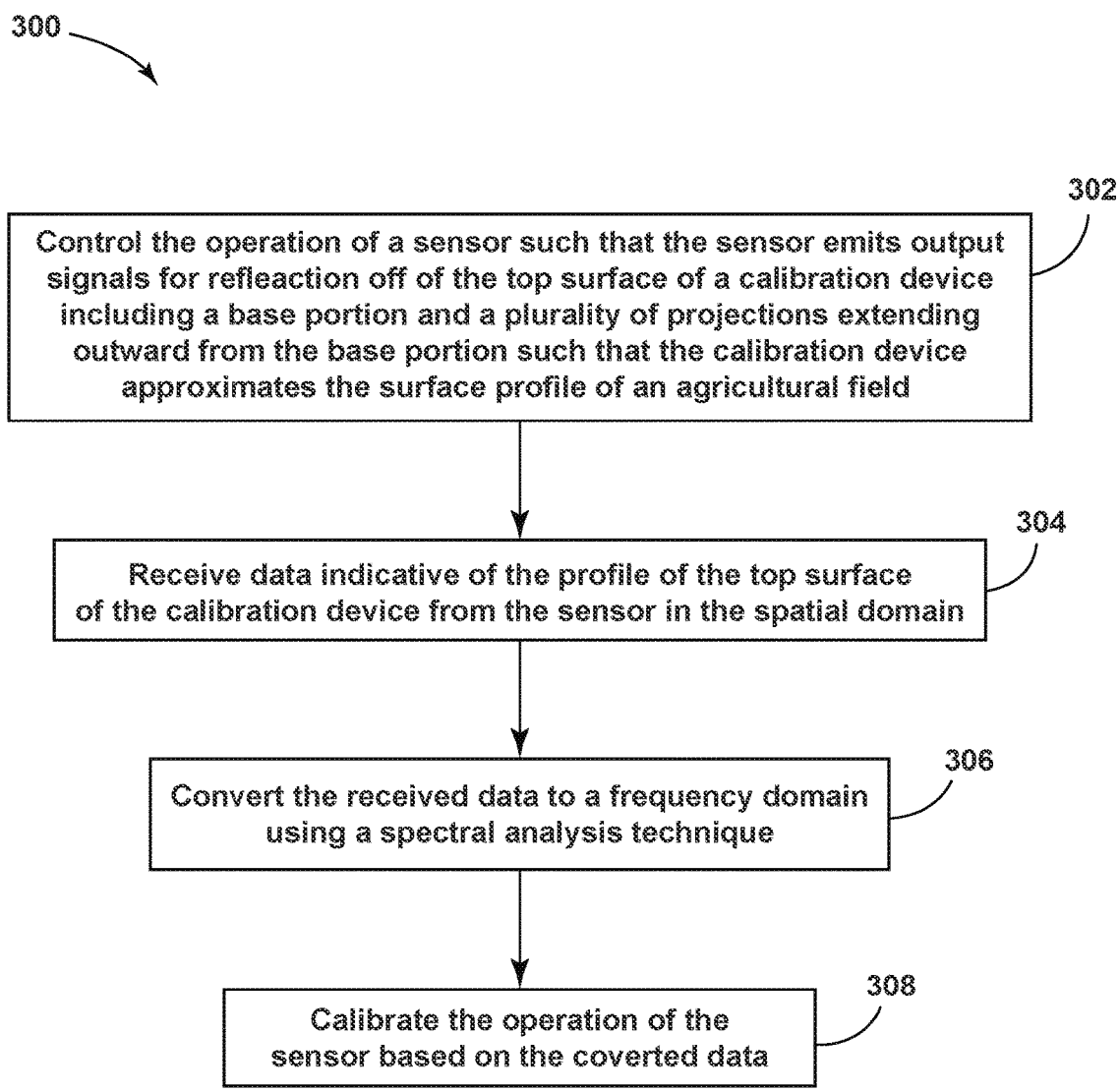
FIG. 6 illustrates a flow diagram of one embodiment of a method for calibrating sensors configured to detect the surface profile of an agricultural field in accordance with aspects of the present subject matter.

Referring now to FIG. 6, a flow diagram of one embodiment of a method 300 for calibrating sensors configured to detect the surface profile of an agricultural field is illustrated in accordance with aspects of the present subject matter. In general, the method 300 will be described herein with reference to the agricultural implement 10, the work vehicle 12, and the system 100 described above with reference to FIGS. 1-5. However, it should be appreciated by those of ordinary skill in the art that the disclosed method 300 may generally be implemented with any agricultural implement having any suitable implement configuration, with any work vehicle having any suitable vehicle configuration, and/or any within system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 may include controlling, with a computing system, the operation of a sensor such that the sensor emits output signals for reflection off of a top surface of a calibration device including a base portion and a plurality of projections extending outward from the base portion such that the calibration device approximates the surface profile of an agricultural field. For instance, as described above, the computing system 128 may be configured to control the operation of a sensor 102 such that the sensor 102 emits output signals 112 for reflection off of the top surface 124 of a calibration device 116 including a base portion 118 and a plurality of projections 120 extending outward from the base portion 118 such that the calibration device 116 approximates the surface profile of an agricultural field (e.g., the profile of the soil surface 106 of the field 104).

Additionally, at (304), the method 300 may include receiving, with the computing system, data indicative of the profile of the top surface of the calibration device from the sensor in the spatial domain. For instance, as described above, the computing system 128 may be configured to receive data indicative of the profile of the top surface 124 of the calibration device 116 from the sensor 102, with such data being in the spatial domain Moreover, as shown in FIG. 6, at (306), the method 300 may include converting, with the computing system, the received data to the frequency domain using a spectral analysis technique. For instance, as described above, the computing system 128 may be configured to convert the received data from the spatial domain to the frequency domain using a spectral analysis technique (e.g., a Fourier transformation technique).

Furthermore, at (308), the method 300 may include calibrating, with the computing system, the operation of the sensor 102 based on the converted data. For instance, as described above, the computing system 128 may be configured to calibrate the operation of the sensor 102 based on the converted data, such as by making one or more mechanical adjustments (e.g., to the sensor position/orientation) or parametric/software-based adjustments (e.g., to an offset(s)).

It is to be understood that the steps of the control logic 200 and the method 300 are performed by the computing system 128 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 128 described herein, such as the control logic 200 and the method 300, is implemented in software code or instructions which are tangibly stored on a tangible computer readable medium. The computing system 128 loads the software code or instructions via a direct interface with the computer readable medium or via a wired and/or wireless network. Upon loading and executing such software code or instructions by the computing system 128, the computing system 128 may perform any of the functionality of the computing system 128 described herein, including any steps of the control logic 200 and the method 300 described herein.

The term "software code" or "code" used herein refers to any instructions or set of instructions that influence the operation of a computer or controller, They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural implement, comprising:
   a frame;
   a plurality of ground-engaging tools supported on the frame, the plurality of ground-engaging tools configured to perform an agricultural operation on a field as the agricultural implement travels across the field;
   a sensor supported on the frame, the sensor configured to emit output signals for reflection off of a surface and detect reflections of the output signals as a return signals; and
   a computing system communicatively coupled to the sensor, the computing system configured to:
   control an operation of the sensor such that the sensor emits the output signals for reflection off of a calibration device including a base portion and a plurality of projections extending outward from the base portion such that a top surface of the calibration device approximates a surface profile of the field;
   receive data indicative of a profile of the top surface of the calibration device from the sensor in a spatial domain;
   convert the received data to a frequency domain using a spectral analysis technique; and
   calibrate an operation of the sensor based on the converted data, wherein, when calibrating the operation of the sensor, the computing system is configured to:
   determine a parameter of the converted data at a frequency corresponding to a spacing of the plurality of ground-engaging tools;
   compare the determined parameter to a predetermined parameter range; and
   when the determined parameter falls outside of the predetermined parameter range, initiate an adjustment to the operation of the sensor.

2. The agricultural implement of claim 1, wherein the parameter comprises a magnitude of the converted data at the frequency corresponding to the spacing of the plurality of ground-engaging tools.

3. The agricultural implement of claim 1, wherein the parameter comprises a phase angle of the converted data at the frequency corresponding to the spacing of the plurality of ground-engaging tools.

4. The agricultural implement of claim 1, wherein, when initiating the adjustment to the operation of the sensor, the computing system is configured to initiate an adjustment to an orientation or a position of the sensor relative to the frame.

5. The agricultural implement of claim 1, wherein, when initiating the adjustment to the operation of the sensor, the computing system is configured to adjust a parametric offset to be applied to the data received from the sensor.

6. A system for calibrating sensors configured to detect a surface profile of an agricultural field, the system comprising:
   a calibration device including a base portion and a plurality of projections extending outward from the base portion such that the calibration device approximates the surface profile of the agricultural field;
   a sensor configured to emit output signals for reflection off of a surface and detect reflections of the output signals as return signals; and
   a computing system communicatively coupled to the sensor, the computing system configured to:
   control an operation of the sensor such that the sensor emits the output signals for reflection off of a top surface of the calibration device;
   receive data indicative of a profile of the top surface of the calibration device from the sensor in a spatial domain;
   convert the received data to a frequency domain using a spectral analysis technique; and
   calibrate an operation of the sensor based on the converted data, wherein, when calibrating the operation of the sensor, the computing system is configured to:
   determine a parameter of the converted data at a frequency corresponding to a spacing of the plurality of ground-engaging tools;
   compare the determined parameter to a predetermined parameter range; and
   when the determined parameter falls outside of the predetermined parameter range, initiate an adjustment to the operation of the sensor.

7. The system of claim 6, wherein the parameter comprises a magnitude of the converted data at the frequency corresponding to the spacing of the plurality of ground-engaging tools.

8. The system of claim 6, wherein the parameter comprises a phase angle of the converted data at the frequency corresponding to the spacing of the plurality of ground-engaging tools.

9. The system of claim 6, wherein, when initiating the adjustment to the operation of the sensor, the computing system is configured to initiate an adjustment to an orientation or a position of the sensor.

10. The system of claim 6, wherein, when initiating the adjustment to the operation of the sensor, the computing system is configured to adjust a parametric offset to be applied to the data received from the sensor.

11. The system of claim 6, wherein the spectral analysis technique comprises a Fourier transformation technique.

12. The system of claim 8, wherein each projection of the plurality of projections defines a rectangular cross-sectional shape.

13. A method for calibrating a sensor configured to detect a surface profile of an agricultural field, the sensor configured to emit output signals for reflection off of a surface and detect reflections of the output signals as a return signal, the method comprising:
   controlling, with a computing system, an operation of the sensor such that the sensor emits the output signals for reflection off of a top surface of a calibration device including a base portion and a plurality of projections extending outward from the base portion such that the calibration device approximates the surface profile of the agricultural field;

receiving, with the computing system, data indicative of a profile of the top surface of the calibration device from the sensor in a spatial domain;

converting, with the computing system, the received data to a frequency domain using a spectral analysis technique; and calibrating, with the computing system, an operation of the sensor based on the converted data, wherein calibrating the operation of the sensor comprises:

determining, with the computing system, a parameter of the converted data at a frequency corresponding to a spacing of the plurality of ground-engaging tools comparing, with the computing system, the parameter to a predetermined parameter range; and when it is determined that the parameter falls outside of the predetermined parameter range, initiating, with the computing system, an adjustment to the operation of the sensor.

14. The method of claim 13, wherein the parameter comprises at least one of a magnitude or a phase angle of the converted data at the frequency corresponding to the spacing of the plurality of ground-engaging tools.

* * * * *